June 30, 1964  A. R. CLARK ETAL  3,138,863
WELD BACK-UP AND METHOD OF APPLYING
Filed May 28, 1959  2 Sheets-Sheet 1

INVENTORS
ANSEL R. CLARK
CALVIN D. LOYD
THEODORE L. OBERLE
BY Fryer and Johnson
ATTORNEYS

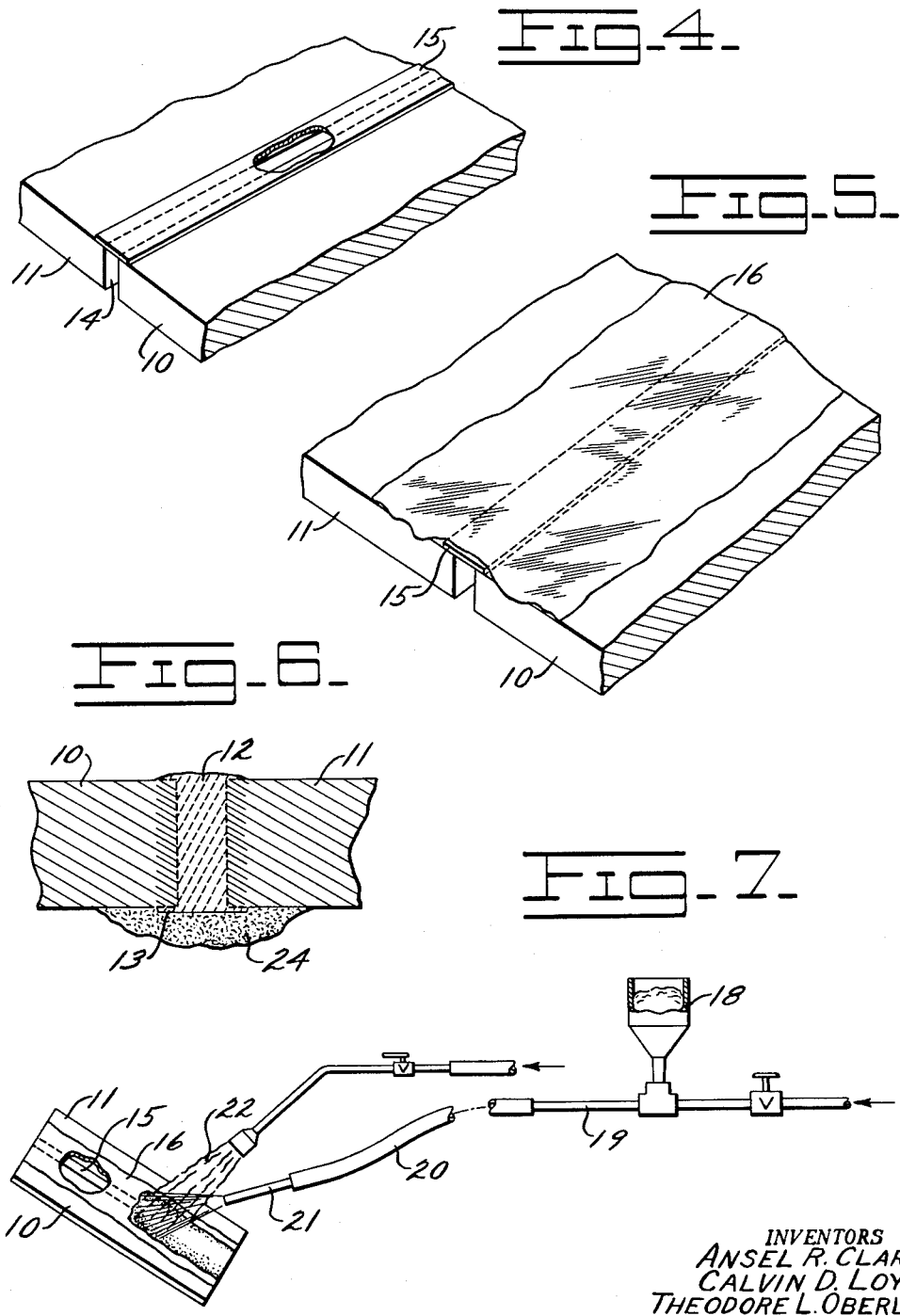

United States Patent Office 3,138,863
Patented June 30, 1964

3,138,863
WELD BACK-UP AND METHOD OF APPLYING
Ansel R. Clark, East Peoria, Calvin D. Loyd, Bartonville, and Theodore L. Oberle, Washington, Ill., assignors to Caterpillar Tractor Co., Peoria, Ill., a corporation of California
Filed May 28, 1959, Ser. No. 816,618
7 Claims. (Cl. 29—527)

This invention relates to welding and pertains more particularly to a method of preparing and applying a back-up material for the cavity or space between two parts to be joined by welding.

The use of a back-up material for welding to limit the flow of the molten metal of which the weldment is formed is well known and various back-up materials and methods have been employed. In some cases a glass, ceramic or other premolded heat resisting member is secured behind the weld gap but such members must be formed precisely to the shape of the parts to be welded and are costly and otherwise undesirable. Loose materials in the form of sand or sand with a binder have also been used for backing up a weld cavity and are held in place by a form of some sort so that their use is practical only when it is possible to weld in a horizontal plane with the back-up material below the work. One disadvantage of using sand with a binder is that it is difficult to apply the composition and cure the binder to the extent that gas pockets will not form therein due to the heat of welding and thereby cause bubbles or voids in the weld. Another disadvantage of sand-type back-up materials is that the weld cavity must be thoroughly cleaned after the application of the back-up material and because of the presence of the sand composition in direction contact with the metal a poor or incomplete weld occurs at the bottom of the cavity where the same is in contact with the metal.

A further disadvantage of sand compositions applied in a plastic state is that warping of the pieces being welded due to welding heat dislodges or breaks the back-up material during the formation of the weld.

It is the object of the present invention to provide an improved weld back-up and a method or backing up a weld gap or cavity between two members which is adaptable to use with members of any size or shape, which overcomes all of the disadvantages referred to above and which produces a weldment superior in appearance and strength to those formed where other back-up processes are employed.

Further and more specific advantages of the invention are made apparent in the following specification wherein the invention and the manner in which it is practiced are set forth in detail by reference to the accompanying drawings.

In the drawings:

FIG. 4 is a fragmentary perspective view of two plates undergoing preparation for welding and illustrating the first step of the method of the present invention;

FIG. 5 is a view like FIG. 4 illustrating the second step of the method;

FIG. 6 is a cross sectional view illustrating a weld between two plates with the back-up material of the present invention still in place; and FIG. 7 is a schematic view illustrating the application of back-up material in accordance with the invention.

In all of the views, two plates joined or to be joined by welding are indicated at 10 and 11 and the weld material at 12, it being understood that the plates may be of any weldable material and the weld deposit of a material suitable for joining them, all in accordance with well known practice.

Figure 1:
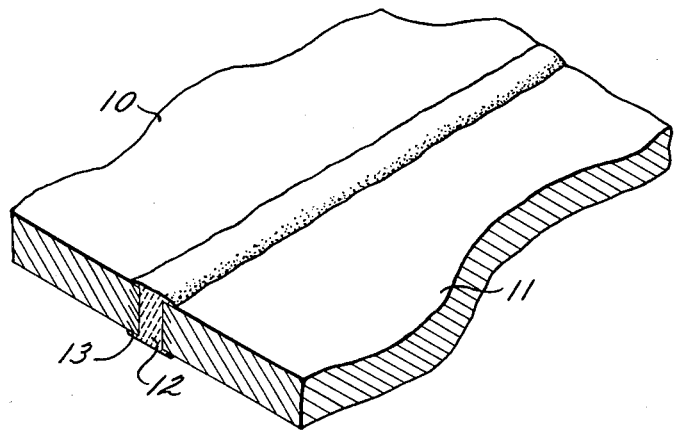
FIG. 1 is a fragmentary perspective view of two plates joined by welding with the method of the present invention.
Figure 2:
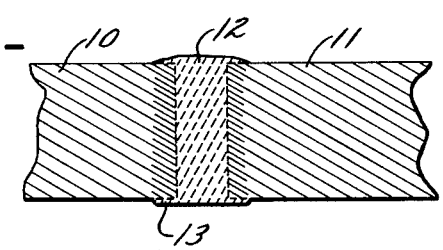
FIG. 2 is a fragmentary cross section of a butt weld between two plates made in accordance with the present invention.
Figure 3:
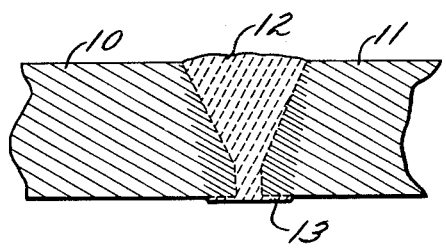
FIG. 3 is a view like FIG. 2 illustrating a similar weld made between plates having beveled edges.

In the sectional views, the original profile of the plates at the edges which form the weld cavity are illustrated in dotted lines and that portion of the plates 10 and 11 which fuses or enters into the weld is represented by cross hatching more closely spaced than that of the plates themselves. One characteristic of the weldment formed when the present invention is practiced is illustrated in FIGS. 1, 2 and 3 where the weld is seen to exceed the cavity between the plates by a slight distance as illustrated at 13 thus positively insuring that the edges of the plates at the inner end or bottom of the cavity are included in the weld which is most frequently not the case when ordinary back-up materials and back-up processes are employed.

The manner of practicing the method of the present invention is best illustrated in FIGS. 4 to 7. In FIG. 4, the plates 10 and 11 to be welded together are shown as spaced to provide a weld cavity 14 and the plates are held in this position by any suitable clamps, jig or tack welds not shown, as is common practice in welding. A strip of tape 15 is then adhesively secured to the plates 10 and 11 in a position to bridge the cavity 14 and overlie the marginal edges of the plates adjacent the cavity. Next a layer of a fluid elastomer or viscous adhesive material characterized by its ability to remain tacky after application is brushed or otherwise applied as shown at 16 in FIG. 5 in a position to cover the tape 15 and the plates 10 and 11 for some distance on opposite sides of the tape.

A mixture of sand and a binder capable of being cured by heat is then applied and cured to form a composition or cake of back-up material behind the tape and tacky material 16. One method and apparatus for applying the sand composition is schematically illustrated in FIG. 7 wherein the sand and binder are blown from a hopper 18 by compressed air from a source, not shown, through a pipe 19, flexible hose 20, and nozzle 21 onto the tacky material 16. Heat from a gas flame 22 or other suitable origin is directed into the sprayed granular material to cure the composition. The tacky material 16 insures adherence of the first particles of sand and the cured binding material forms a cake such as illustrated at 24 in FIG. 6. Other methods of heating may be employed. In FIG. 6 the heat of the welding operation has burned away the tape 15 making space for that portion of the weld 13 which exceeds the edges of the plates 10 and 11 as previously described.

The tape 15 may be of any material readily destroyed by the high temperatures of welding and may be secured to the plates with any suitable adhesive. Ordinary masking tape of the type having a pressure sensitive adhesive has been found suitable and expedient and as it is burned away during the welding process, it leaves space for the portion of the weld shown at 13, the thickness of which is somewhat exaggerated in the drawings.

Rubber cement having a Buna N rubber base diluted to a brushable consistency has been used effectively for the coating 16 though any similar material capable of being brushed or otherwise applied to the surface and retaining a tackiness after application will serve the purpose. The elastic quality of this material makes possible considerable movement of the plates due to warping without cracking or dislodging the back-up material.

The material 24 is a composition of sand and a binder which is solidified or cured with heat. That is, the materials in granular form are sprayed onto the surface as illustrated in FIG. 7 with the application of heat to soften the binder so that the material will adhere in a cake-like form readily broken away after the weld is complete. Phenolic resin is an example of one binder suitable for this purpose and will perform in the manner described upon the application of heat between 300° to 1200° F. Any suitable heat source may be employed to supply the required heat.

This method of backing a weld cavity has the advantage that it can be employed other than on horizontal surfaces because the materials adhere to the work and vertical and even overhead surfaces may be prepared for welding in this manner. Furthermore it is readily adaptable to welding pieces of any shape without the necessity of precasting or forming weld back-up units to fit the shape of the articles to be welded. There is no overlap of the back-up material into the cavity but it is rather spaced from the cavity by the thickness of a tape which insures perfect welding at the bottom of the cavity and since the material 24 is porous, gases which ordinarily cause voids in a weld are permitted to escape through it. Furthermore since it is impossible for the back-up material to enter the cavity through the tape, the surfaces to be welded need not be cleaned after the application of the material.

The method of the present invention is intended and readily adaptable for use with automatic welding machines using the submerged arc weld process. However hand welding of various types may also be performed in a cavity prepared in the manner described.

We claim:

1. The method of applying a weld back-up to parts to be welded which comprises bridging a welding gap between the parts with a heat destructible tape, coating the tape, and the parts adjacent to it with a tacky substance, and applying a mixture of heat resistant granular material and a heat curable binder, and heating the same to form a cake of back-up material over the tacky substance.

2. The method of applying a back-up material across a gap between parts to be welded which comprises first bridging the gap with a heat destructible tape adhesively secured to the parts, and then applying a mixture of heat resistant granular material and a heat curable binder, and heating the same to form a cake of weld back-up material over the tape and portions of the parts on both sides of the tape, and causing the cake to adhere thereto whereby molten welding material entering the gap will burn away the tape and occupy the space so provided.

3. The method of applying a back-up material across a gap between parts to be welded which comprises first bridging the gap with a heat destructible tape adhesively secured to the parts, then applying a tacky adhesive over the tape and portions of the parts on both sides of the tape, and then applying a mixture of heat resistant granular material and a heat curable binder, and heating the same to form a cake of back-up material over the tacky adhesive.

4. The method of applying a back up material across a gap between parts to be welded which comprises first bridging the gap with a heat destructible tape adhesively secured to the parts, then applying an elastic adhesive material in fluid form over the tape and portions of the parts on both sides of the tape, and then applying a mixture of heat resistant granular material and a heat curable binder, and heating the same to form a cake of back-up material over the tacky adhesive.

5. The method of applying a back-up material across a gap between parts to be welded which comprises first covering the gap with a heat destructible paper-like tape to prevent the entry of back-up material into the gap, coating the tape and adjacent areas of the parts with a tacky substance, then spraying a heat resistant granular material and a heat curable substance mixed therewith over the tape and portions of the parts adjacent the tape, and heating the granular material and heat curable substance as it is sprayed to form a cake of back-up material covering the tape and bridging the gap.

6. The method of applying a back-up material across a gap between parts to be welded which comprises first covering the gap with a paper-like tape to prevent the entry of back-up material into the gap, then coating the tape and the parts adjacent to it with a rubber base cementitious adhesive in fluid form, and then forming a cake of back-up material against said adhesive by applying a mixture of heat resistant granular material and a heat curable binder while heating the same.

7. The method of applying a back-up material across a gap between parts to be welded which comprises first covering the gap with a heat destructible paper-like tape to prevent the entry of back-up material into the gap, then coating the tape and the parts adjacent to it with a rubber base cementitious adhesive in fluid form, and then applying a cake against said adhesive by spraying a composition of sand and heat curable resinous material onto the adhesive and applying heat thereto during spraying.

References Cited in the file of this patent

UNITED STATES PATENTS

| | | |
|---|---|---|
| 1,368,947 | Levis | Feb. 15, 1921 |
| 1,962,352 | Kane | June 12, 1934 |
| 2,173,109 | Hamblin | Sept. 19, 1939 |
| 2,320,700 | Kent | June 1, 1943 |
| 2,331,937 | Schreiner | Oct. 19, 1943 |
| 2,362,505 | Smith | Nov. 14, 1944 |
| 2,434,321 | Kleiner et al. | Jan. 13, 1948 |
| 2,534,805 | Waterfield | Dec. 19, 1950 |
| 2,743,515 | Davis et al. | May 1, 1956 |
| 2,820,427 | Chyle et al. | Jan. 21, 1958 |
| 2,847,958 | Norton et al. | Aug. 19, 1958 |
| 3,001,057 | Hackman et al. | Sept. 19, 1961 |